United States Patent [19]

Kadota

[11] 3,862,370

[45] Jan. 21, 1975

[54] TIME DIVISION ELECTRONIC SWITCHING SYSTEM FOR EXTERNAL HIGHWAYS OF DIFFERENT MULTIPLEXING RATIOS

[75] Inventor: Shinsuke Kadota, Tokyo, Japan

[73] Assignee: Nippon Electric Company Ltd., Tokyo, Japan

[22] Filed: Oct. 6, 1972

[21] Appl. No.: 295,650

[30] Foreign Application Priority Data

Oct. 8, 1971 Japan .............................. 46-78768

[52] U.S. Cl. ........................ 179/15 BV, 179/15 BA

[51] Int. Cl. .............................................. H04j 3/00

[58] Field of Search ....... 179/15 AT, 15 AQ, 15 BS, 179/15 BV, 15 BA, 15 A

[56] References Cited

UNITED STATES PATENTS

| | | | |
|---|---|---|---|
| 3,632,884 | 1/1972 | Inose | 179/15 AQ |
| 3,676,599 | 7/1972 | Heetman | 179/15 BS |
| 3,766,322 | 10/1973 | Moffett | 179/15 BV |

*Primary Examiner*—Ralph D. Blakeslee
*Attorney, Agent, or Firm*—Sughrue, Rothwell, Mion, Zinn & Macpeak

[57] ABSTRACT

A time division electronic switching system operable with a predetermined multiplexing ratio is connected to external highways for transmitting external time division multiplexed pulse signals of different multiplexing ratios through multiplexing ratio transforming units for multiplexing time division multiplexed pulse signals of smaller multiplexing ratios in a time division fashion into time division multiplexed pulse signals of a larger multipexing ratio and for demultiplexing time division multiplexed pulse signals of a larger multiplexing ratio into time division multiplexed pulse signals of smaller multiplexing ratios of cyclically extracting the time division multiplexed pulse signals of the larger multiplexing ratio.

6 Claims, 14 Drawing Figures

PATENTED JAN 21 1975

3,862,370

SHEET 2 OF 6

TIME DIVISION ELECTRONIC SWITCHING SYSTEM FOR EXTERNAL HIGHWAYS OF DIFFERENT MULTIPLEXING RATIOS

BACKGROUND OF THE INVENTION

This invention relates to a time division electronic switching system operable with a predetermined multiplexing ratio and for connection to external highways for transmitting external time division multiplexed pulse signals of different multiplexing ratios. As is well-known, the term multiplexing ratio refers to the number of channels per frame in the multiplexed data format. For example and external highway or transmission path carrying data in the multiplexed format of six channels of data per frame has a multiplexing ratio of six.

It is desirable that a time division electronic switching system is operable with a multiplexing ratio which is the same as the multiplexing ratio of each of the routes served thereby. When the routes are of different multiplexing ratios, it is therefore preferable to render the switching system operable with a plurality of multiplexing ratios of the various routes served which are equal to the different multiplexing ratios. It is, however, difficult to realize a time division electronic switching system operable with a large number of multiplexing ratios. The result is that the multiplexing ratios of a switching system of the type referred to are too great for some of the routes served and too small for others of the routes served. On the other hand, a time division electronic switching system operable with a single multiplexing ratio is advantageous in that the system is simple in construction, making it easy to design and manufacture the highway switch and the pulse switches generally used in a switching system of the kind referred to.

SUMMARY OF THE INVENTION

It is therefore an object of the present invention to provide a time division electronic switching system operable with a single multiplexing ratio and yet adapted for connection with the routes or highways of different multiplexing ratios.

It is another object of this invention to provide a switching system of the type described, with which it is possible to raise the efficiency of the time division electronic switching network.

According to this invention, there is provided a time division electronic switching system of a predetermined multiplexing ratio which is adapted to be connected to at least two external highways transmitting external time division multiplexed pulse signals of different multiplexing ratios. The system includes a plurality of internal highways or signal connection paths for carrying internal time division multiplexed pulse signals, a common control means responsive to the data supplied through one of said external highways for producing compiled data, and a highway matrix interposed between said internal highways and responsive to the compiled data for spatially interconnecting the internal highways in accordance with the compiled data. The improvement described herein comprises multiplexing ratio transforming means coupled between external highways internal highways for carrying out the conversion between the multiplexing ratios of the external highways and the multiplexing ratio of the internal highways. Also, pulse shifter means are interposed in the internal highways between the multiplexing ratio transforming means and the highway switch matrix. The pulse shifter means are responsive to the complied data for transferring pulse signals or data from one time slot to another time slot in the multiplexed format on the internal highways.

DESCRIPTION OF PREFERRED EMBODIMENT

Figure 1:
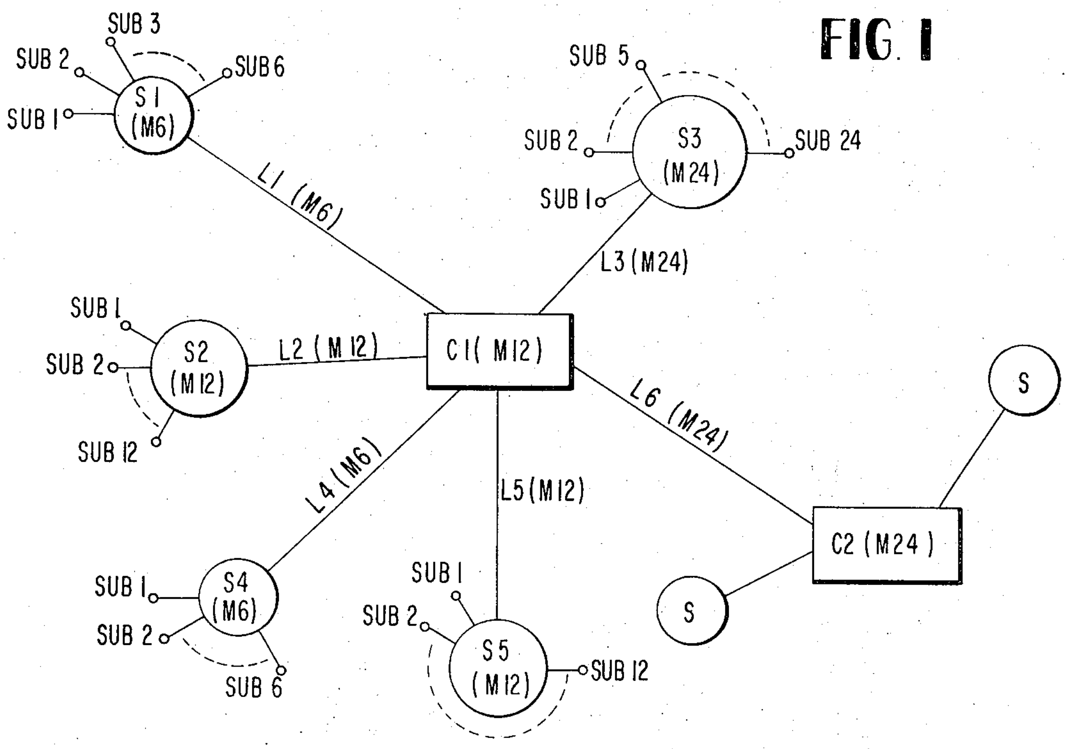
FIG. 1 is a diagram of a time division electronic switching network to which the instant invention is applicable.

Referring to FIG. 1, a time division electronic signal system is shown comprising two time division electronic switching systems C1 and C2. A plurality of line concentrators, such as a first through a fifth line concentrator S1 through S5, are connected via external highways L1–L5 to the first switching system C1. Two line concentrators S are shown connected to the second switching system C2. The routes or highways, such as L1 through L6, carry time division multiplexed pulse signals between the switching systems and the line concentrators. Each of the line concentrators serves for a predetermined number of subscriber's stations SUB1 through SUB6, SUB12, or SUB24, and comprises a common modulator for modulating the original signals received from the subscriber's stations into pulse signals of respective channels, a multiplexer for cyclically extracting the pulse signals of the channels and arranging the extracted pulse signals in a time division fashion into a train of time division multiplexed signals, a driver for sending the multiplexed pulse signals to the switching system, a receiver for receiving a train of external time division multiplexed pulse signals from the switching system, a demultiplier for distributing the received pulse signals cyclically into pertinent channels, and a common demodulator for demodulating the demultiplexed pulse signals into reproductions of the original signals to be sent to the pertinent subscriber's stations. Line concentrators of this type are well-known in the art. By way of example, the multiplexing ratios are denoted in FIG. 1 in the parentheses by the numerals following the letter M. As will become clear later, the multiplexing ratios are preferably an integral multiple of a certain common measure, such as six. The switching system, such as C1, may be installed in a central office while the line concentrators may be installed either in a central office or in a local office. In contrast to the internal highways or signal paths used within a time division electronic switching system, such as C1, to transmit internal time division multiplexed pulse signals of a predetermined multiplexing ratio, e.g. twelve, each of the routes L1–L6 will herein be called an external highway although some or all of the routes may in fact be intra-office highways.

Figure 2:
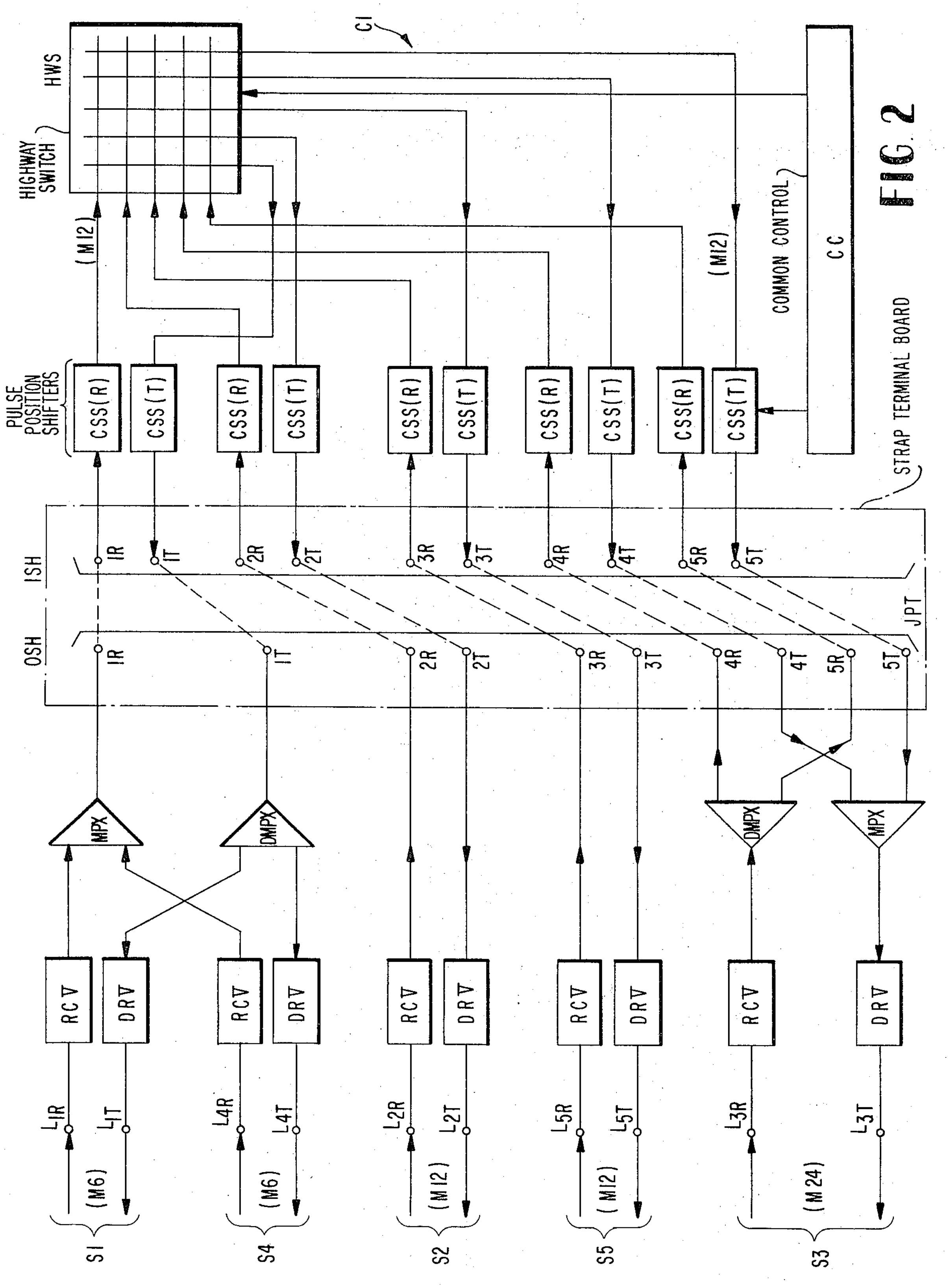
FIG. 2 is a block diagram of a time division electronic switching system according to this invention.

Referring to FIG. 2, the electronic switching system C1 is shown therein as an example of the switching systems according to the present invention. The system C1 receives multiplexed pulse signals from the line concentrators via incoming external highways L1R through L5R and transmits multiplexed pulse signals via outgoing external highways L1T through L5T to the line concentrators. The multiplexing ratios are indicated by the M number adjacent the external highways. Internal highways, such as outside highways OSH and inside highways ISH, carry multiplexed pulse signals inside the system. Line receivers RCV are connected to the respective incoming highways for transforming and shaping the external multiplexed pulse signals into the internal multiplexed pulse signals and for adjusting the phase of the resulting pulse signals relative to to the local clock pulses used in the switching system. Line drivers DRV are connected to the respective outgoing highways for transforming the intermediate and internal multiplexed pulse signals into the wave external multiplexed pulse signals and for amplifying the latter pulse signals for transmission to the line concentrators. In order to separately designate the multiplexed pulse signals by their positions, the signals on the external highways are referred to as external multiplexed pulse signals, the signals on the internal highways are referred to as internal multiplexed pulse signals, and the signals in between receivers or drivers DRV on the one hand and multiplexers MPX and demultiplexers DMPX on the other hand are referred to as intermediate multiplexed pulse signals. Multiplexers MPX are connected by paths called intermediate highways to those receivers associated with the lines, such as L1 and L4, of smaller multiplexing ratios and to those drivers associated with the lines, such as L3, of greater multiplexing ratios. Demultiplexers MPX are connected by intermediate highways to receivers associated with lines such as L3, of greater multiplexing ratio and to those drivers associated with the lines, such as L1 and L4, of smaller multiplexing ratios. It will be seen from FIG. 2 that some of the outside highways OSH are connected to the multiplexers and demultiplexers and that the remaining ones of the outside highways OSH are connected directly to those line receivers and drivers associated with the incoming and the outgoing highways, such as L2R, L2T, L5R, and L5T, of the predetermined multiplexing ratio. It will be appreciated later that a set of the line receivers and drivers RCV and DRV and another set of the multiplexers and demultiplexers MPX and DMPX constitute the multiplexed pulse signal transforming means and the multiplexing ratio transforming means, respectively. The switching system C1 further comprises a common control CC responsive to a call originating with one of the subscriber's stations for compiling the information required for establishment of the connection and for supplying the compiled data to various parts of the switching system in the manner generally known in the art. A strap terminal board JPT having a plurality of receive terminals 1R through 5R and transmit terminals 1T through 5T is provided for interconnecting the outside and the inside highways OSH and ISH to raise the efficiency of the inside highways ISH in the known manner. A plurality of pulse shifters or switches CSS(R) for reception and; CSS(T) for transmission are interposed in the transmitting inside highways. In response to the compiled data supplied from the common control CC, through connections not shown for simplification of illustration, each of the pulse shifters CSS(R) and CSS(T) interchanges the pulse positions of the pulse signals that are travelling through the internal highway. In this manner, transfer of those internal multiplexed pulse signals transmitted through the internal highways which are specified by the compiled data occurs between the time slots selected also by the compiled data. The switching system C1 still further comprises a highway switch HWS interposed between the receiving and the transmitting internal highways and responsive to the compiled data for spatially transferring the internal multiplexed pulse signals from that receiving highway to that transmitting highway which are identified by the compiled data. In this manner, the spatial interconnections are established between the desired internal highways.

The overall operation of the switching system will be explained below following the description of several of the elements shown in block form in FIG. 2. For the present it will be appreciated that a pulse signal representing data from any subscriber can be transferred from its time slot on an incoming external highway to any desired time slot on any outgoing external highway for ultimate transmission to any desired subscriber. The compiled data controls the highway switch in a known manner to make the necessary connection between the internal highways. The compiled data also controls the pulse shifters CSS(R) and CSS(T) in a known manner to shift the desired pulse signal from its incoming slot position to a desired outgoing slot position. The multiplexers and demultiplexers provide the necessary multiplexing ratio transformation.

Figure 3:
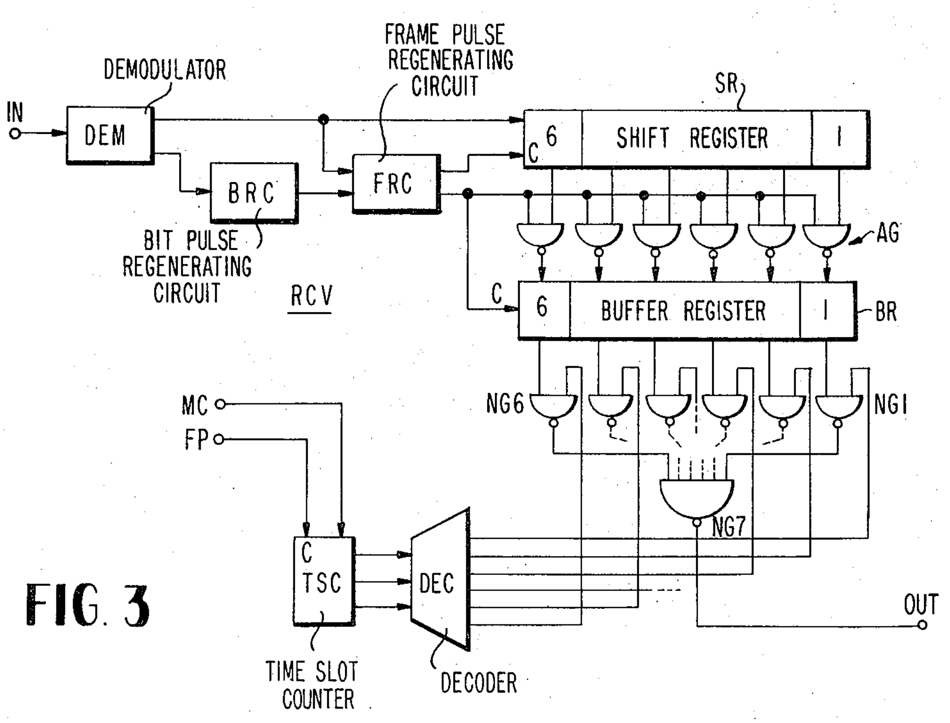
FIG. 3 is a block diagram of a line receiver used in the switching system illustrated in FIG. 2.
Figure 4:
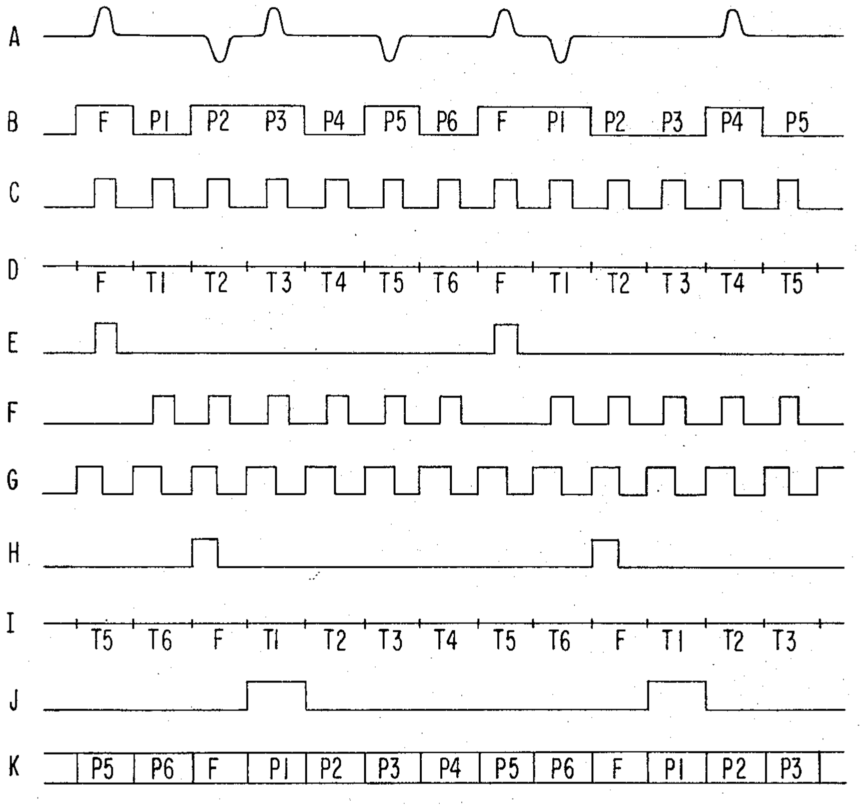
FIG. 4 shows signals appearing at various points in the line receiver depicted in FIG. 3.

Referring to FIGS. 3 and 4, each of the line receivers RCV comprises an input terminal IN connected to one of the incoming highways LR, a demodulator DEM connected to the input terminal IN for transforming the external multiplexed pulse signals that are supplied through the terminal IN and that have, for example, a bipolar wave form exemplified in FIG. 4A into demodulated multiplexed pulse signals of, for example, a unipolar wave form depicted in FIG. 4B and into reformed external multiplexed pulse signals. A bit pulse regenerating circuit BRC supplied with the reformed multiplexed pulse signals operates to regenerate unipolar external clock pulses illustrated in FIG. 4C. The external clock pulses occur at every time slot F, T1, . . . , T6, F, T1, . . . shown in FIG. 4D. The frame shown is for pulse signals of multiplexing ratio M6. A frame pulse regenerating circuit FRC responsive to the demodulated multiplexed pulse signals and to the external clock pulses produces inter-frame pulses appearing at the beginning F of every frame as illustrated in FIG. 4E and also produces shift pulses occurring at those time slots T1, T2, . . . , and T6 of each frame as shown in FIG. 4F which do not coincide with the inter-frame pulses. It is now understood in connection with the example being illustrated that the multiplexing ratio for the external highway connected to the receiver is assumed to be six and consequently that a frame consists of six time slots T1, T2, . . . , and T6 for speech signals P1 through P6 of a first through a sixth channel plus a time slot for each inter-frame pulse. The line receiver RCV further comprises a shift register SR having six stages and responsive to the shift pulses supplied at its clock input terminal C for storing the demodulated multiplexed pulses serially in order and for transforming the serial information into parallel information. Six AND gates AG are controlled by the inter-frame pulses for gating the parallel information into a buffer register BR having six stages. Register BR stores the parallel information until a next subsequent inter-frame pulse is supplied to its clear terminal C. An intermediate clock input terminal MC is supplied with the intermediate clock pulses exemplified in FIG. 4G, and an intermediate inter-frame pulse input terminal FP is supplied with the intermediate inter-frame pulses illustrated in FIG. 4H by way of example. It should be noted that the intermediate clock and inter-frame pulses are derived by means, not shown, for frequency demultiplying or, as the case may be, frequency multiplying the internal clock and inter-frame pulses into intermediate time slots illustrated in FIG. 4I. The internal clock and inter-frame pulses are used directly as the intermediate ones when the multiplexing ratio for the external highway connected to the receiver is equal to that for an internal highway. The line receiver RCV still further comprises a time slot binary counter TSC supplied with the intermediate clock pulses and cleared by the intermediate inter-frame pulses supplied to its clear terminal C for producing parallel count information representative of the current time slot numbers of the intermediate time slots. A decoder DEC responsive to the parallel count information cyclically produces timing pulses on one of its six output leads at every intermediate time slot except for the one time slot in each frame corresponding to the position of the intermediate inter-frame pulse. As an example the cyclic pulses on the first output lead are depicted in FIG. 4J. A first through a sixth NAND gate NG1 through NG6 are responsive to the respective timing pulses for gating the parallel information stored in the buffer register BR to output terminal OUT via seventh NAND gate NG7. As the timing pulses cyclically vary from logic "0" to logic "1," the speech data P1 through P6 stored in the pertinent stages of the buffer register BR are arranged at the output of the seventh NAND gate in the manner illustrated in FIG. 4K. This serial speech information is either the intermediate multiplexed pulse signals of the wave form prevailing within the switching system or the internal multiplexed pulse signals and is such a reproduction of the external speech information as is synchronized with the internal clock and inter-frame pulses.

Figure 5:
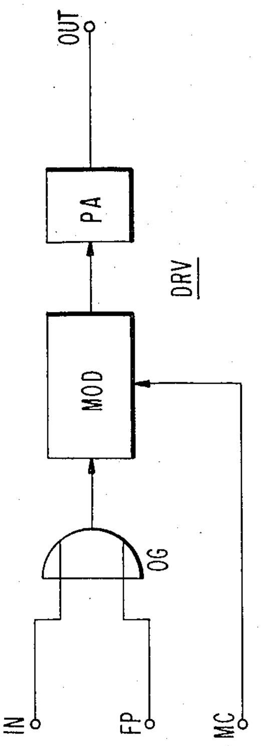
FIG. 5 is a block diagram of a line driver used in the switching system shown in FIG. 2.
Figure 6:
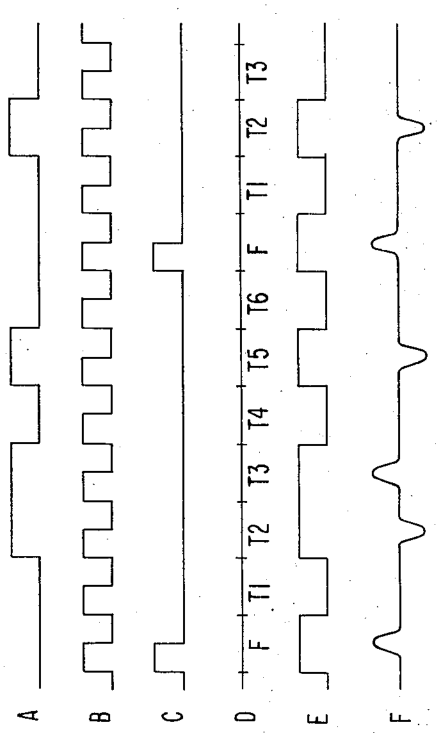
FIG. 6 shows signals appearing at various points in the line driver illustrated in FIG. 5.

Referring to FIGS. 5 and 6, each of the line drivers DRV comprises an input terminal IN connected either to one of the multiplexers MPX or demultiplexers DMPX via an intermediate highway or to one of the internal highways. The latter case applies if the multiplexing ratio of the external highway connected to the driver DRV is equal to the multiplexing ratio for the switching system. The driver DRV further comprises a first internal input terminal MC supplied with the intermediate clock pulses illustrated with reference to FIGS. 3 and 4G and reproduced in FIG. 6B and a second internal input terminal FP supplied with the intermediate inter-frame pulses illustrated with reference to FIGS. 3 and 4H and again exemplified in FIG. 6C. When the input terminal IN of the driver DRV is connected to an internal highway, the internal clock and inter-frame pulses as such are used as the intermediate clock and inter-frame pulses. It is noted that the intermediate clock and inter-frame pulses define the intermediate line slots shown again in FIG. 6D. The line driver still further comprises an OR gate OG for mixing the intermediate or the internal multiplexed pulse signals exemplified in FIG. 6A and the corresponding inter-frame pulses to derive a combined pulse train illustrated in FIG. 6E. A modulator MOD responsive to the supplied clock pulses transforms the combined pulse train into multiplexed pulse signals of the bipolar wave form used in the external highways and the line concentrators, such as shown in FIG. 6F. An output terminal OUT is connected to one of the outgoing external highways LT, and a power amplifier PA produces the external multiplexed pulse signals to be driven towards the line concentrator associated with this line drive DRV.

Figure 8:
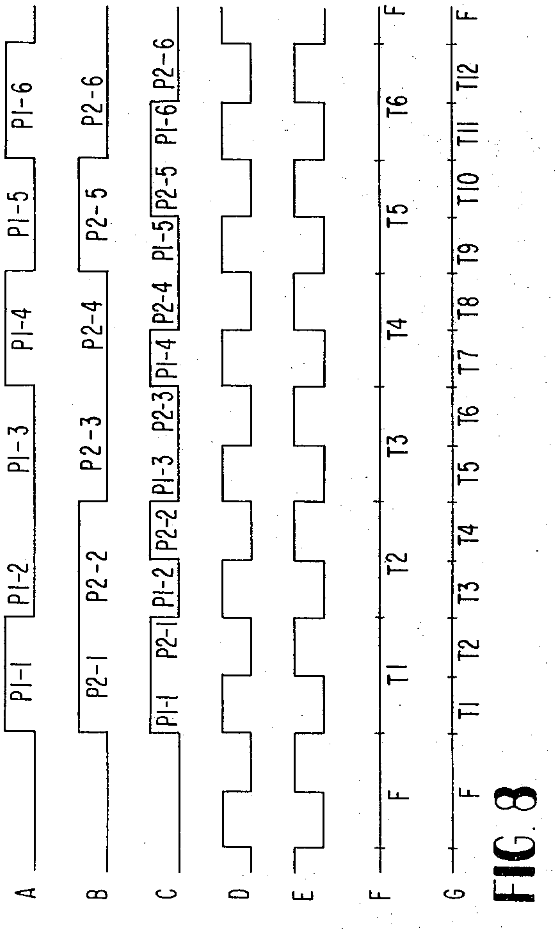
FIGS. 8 and 9 show signals appearing at various points in the multiplexer depicted in FIG. 7.
Figure 7:
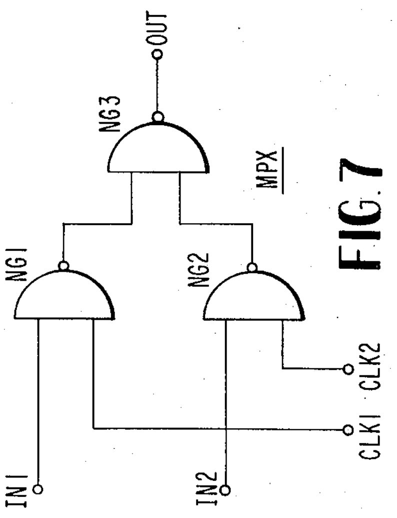
FIG. 7 is a block diagram of a two-input multiplexer used in the switching system shown in FIG. 2.
Figure 9:
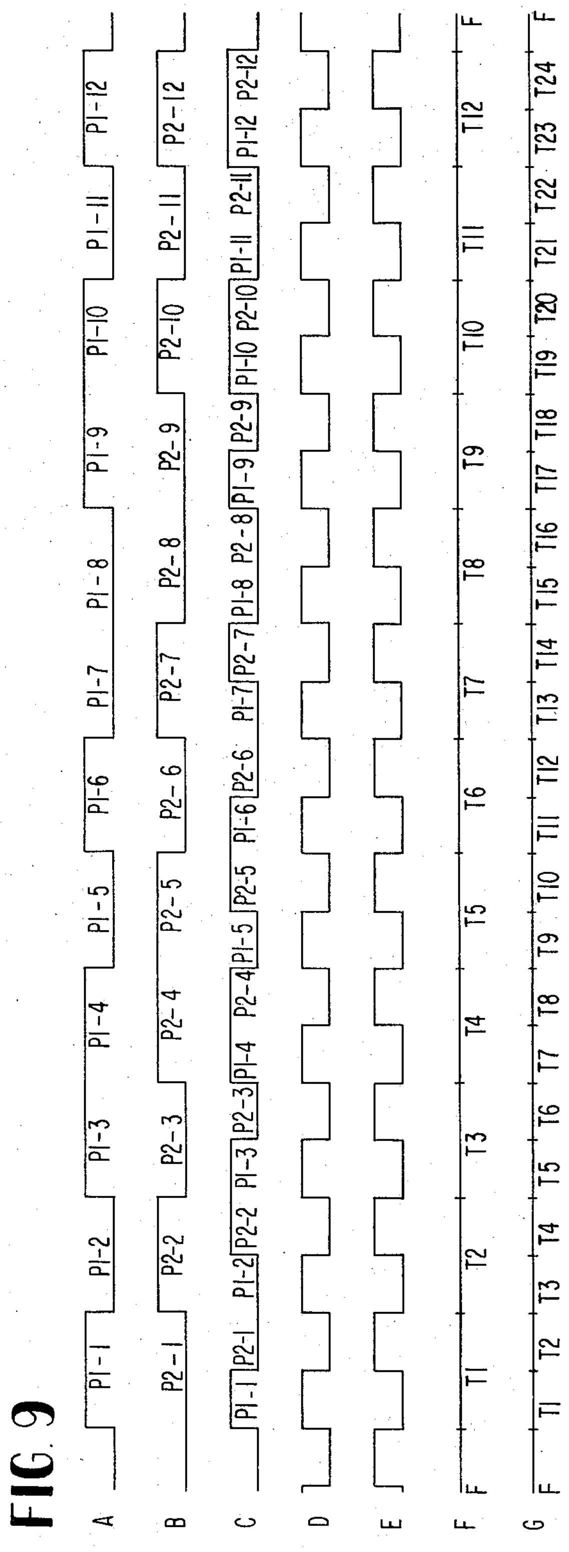

Referring to FIGS. 7 through 9, each of the two-input multiplexers MPX comprises a first and a second input terminal IN1 and IN2. As seen in FIG. 2, the input terminals of any multiplexer is connected either to two of the line receivers RCV for the external highways of the multiplexing ratio of six or to two of the internal highways when this multiplexer MPX is used for an external highway of the multiplexing ratio of twenty-four. In the former case first and the second input terminals IN1 and IN2 are supplied with a first and a second train of the external multiplexed pulse signals exemplified in FIGS. 8A and B, and in the latter case the input terminals are supplied with a first and a second train of internal multiplexed pulse signals illustrated in FIGS. 9A and B. The multiplexer MPX further comprises an output terminal OUT connected either to one of the internal highways to one of the drivers for supplying thereto an output multiplexed pulse signal train shown either in FIG. 8C for the internal multiplexed pulse signals or in FIG. 9C for the external multiplexed pulse signals. First and a second clock input terminals CLK1 and CLK2 are supplied with first and second complementary clock pulse trains depicted either in FIGS. 8D and E or FIGS. 9D and E, respectively. It is to be noted that these clock pulses are derived by means, not shown, in synchronism with the time slots of the input pulse signals shown in FIGS. 8F for the intermediate time slots and in FIG. 9F for the internal time slots. In addition, it is assumed here that the first clock pulses assume the values of logic "1" and "0" at the former and the latter halves of each time slot, respectively. The multiplexer MPX still further comprises a first and a second NAND gate NG1 and NG2, each supplied with the corresponding ones of the input multiplexed pulse signal trains and the clock pulse trains, and a third NAND gate NG3 supplied with the output signals of the first and the second NAND gates. It will now be appreciated that the first halves of the speech information P1–1, P1–2, . . . , P1–6, . . . carried by the first input pulse train and the second halves of the second speech information P2–1, P2–2, . . . , P2–6, . . . consecutively appear in a time division fashion at the output terminal OUT as shown in FIGS. 8A, B, and C or FIGS. 9A, B, and C and that it is possible to provide a similar multiplexer for a given numer of the input multiplexed pulse trains with a like number of clock pulse trains in which the pulses successively become logic "1" for a period of each input time slot divided by the given number.

As seen by waveforms A, B and C of FIG. 8, when the multiplexer inputs are connected to two intermediate highways, each having multiplexing ratio of six, the output pulse train has a multiplexing ratio of twelve, suitable for internal switching within the system. As seen by waveforms A, B, and C of FIG. 9, when the multiplexer inputs are connected to two internal highways, each of multiplexing ratio twelve, the output pulse train has a multiplexing ratio of twenty-four and is suitable for connection to a driver DRV which sends out pulses along an external highway such as L3T, also having a multiplexing ratio of twenty-four.

Figure 10:
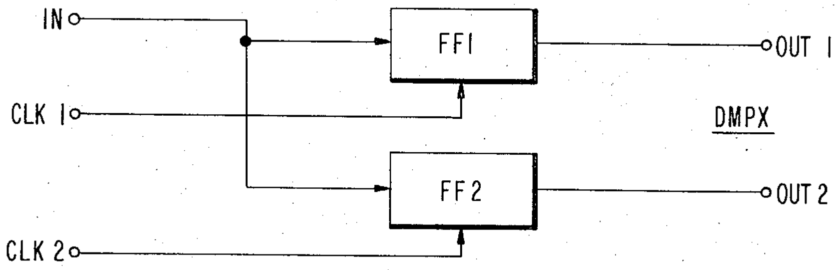
FIG. 10 is a block diagram of a two-output demultiplexer used in the switching system illustrated in FIG. 2.
Figure 11:
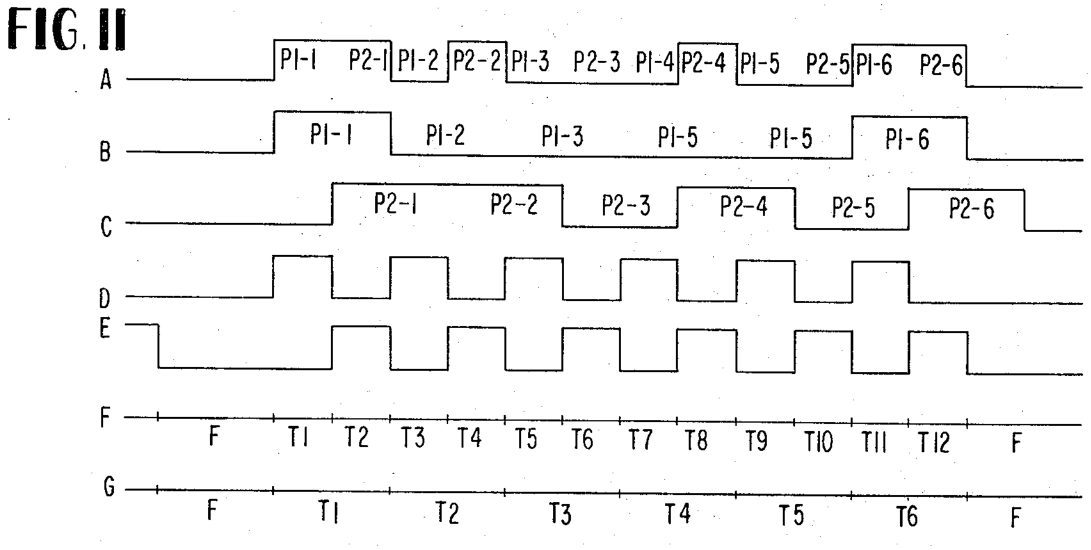
FIG. 11 shows signals appearing at various points in the demultiplexer illustrated in FIG. 10.

Referring to FIGS. 10 and 11, each of the two output demultiplexers DMPX is interposed either between one of the line receivers RCV for the external highways of the multiplexing ratio of twenty-four and two of the internal highways or between one of the internal highways and two of the line drivers DRV for the external highways of the multiplexing ratio of six. The demultiplexer DMPX will be described hereunder with particular reference to the latter of the two alternative cases. The demultiplexer DMPX comprises an input terminal IN connected to one of the internal highways and supplied with internal multiplexed pulse signals exemplified in FIG. 11A. First and second output terminals OUT1 and OUT2 are connected to two of the intermediate highways leading to the line drivers of the kind mentioned above for supplying thereto a first and a second train of the intermediate multiplexed pulse signals, such as illustrated in FIGS. 11B and C, respectively. First and second clock input terminals CLK1 and CLK2 are supplied with first and second complementary clock pulse trains shown in FIGS. 11D and E, respectively. These clock pulses are derived from the internal clock pulses of the internal time slots depicted in FIG. 11F and the first clock pulses become logic "1" at former halves of the time slots of FIG. 11G which serve as the external time slots. The demultiplexer DMPX further comprises first and second flip-flop circuits FF1 and FF2 responsive to the respective clock pulse trains for memorizing the corresponding internal multiplexed pulse signals when the clock pulses become logic "1" and for delivering the memorized data to the respective output terminals upon occurence of the next subsequent clock pulses in a manner similar to the NAND gates of the multiplexer MPX.

Figure 12:
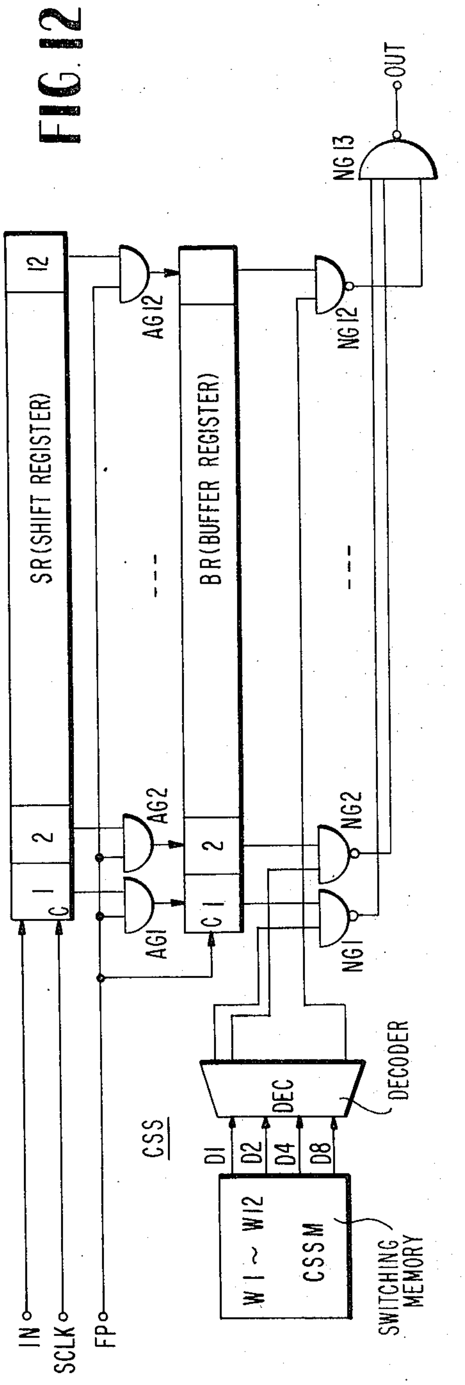
FIG. 12 is a block diagram of a pulse shifter used in the switching system illustrated in FIG. 2.
Figure 13:
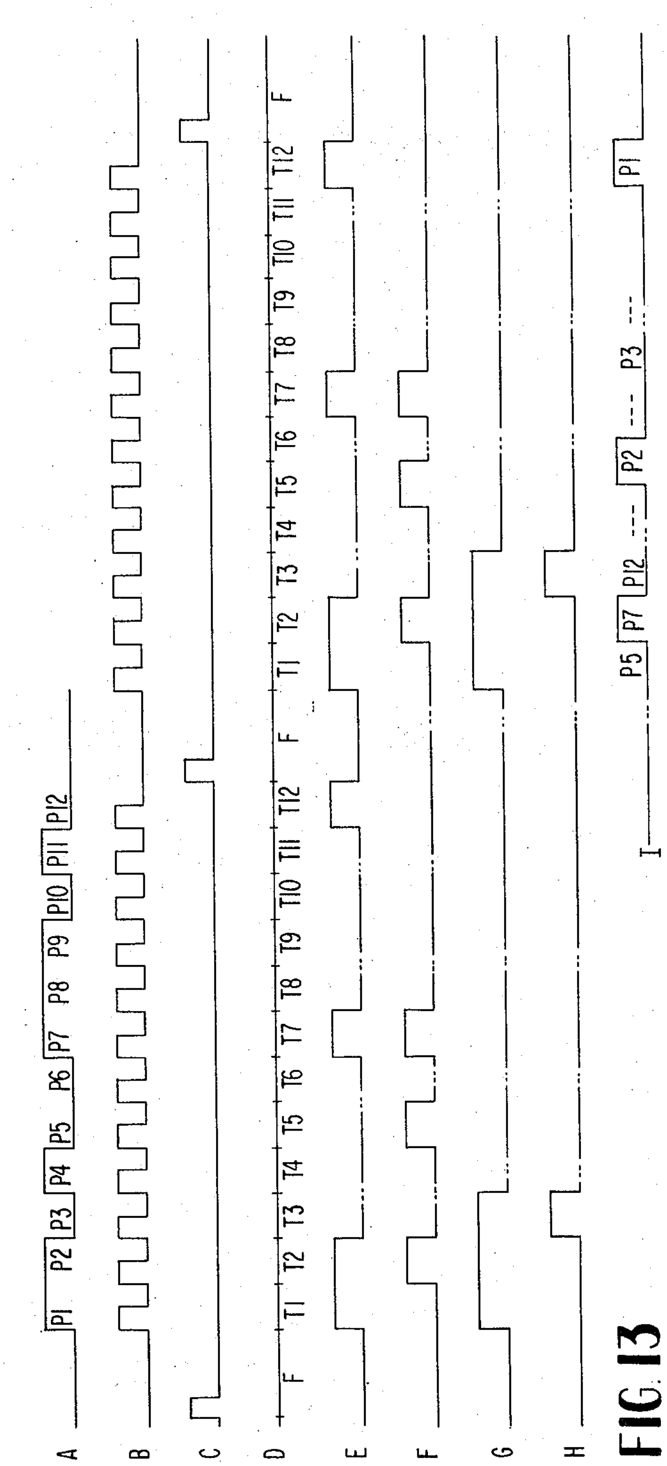
FIG. 13 shows signals appearing at various points in the pulse shifter depicted in FIG. 12.

Referring to FIGS. 12 and 13, each of the pulse shifters CSS for reception (R) and for transmission (T) comprises an input terminal IN connected either to one of the receive internal highways derived from the strap terminal board JPT or to one of the transmit internal highways led from the highway switch HWS. The pulse shifter is supplied with the input multiplexed pulse signal train representative of speech data P1, P2, . . . , P12, . . . in the manner exemplified in FIG. 13 and provides the same pulses at its output terminal in any desired odrer such as illustrated in FIG. 13I. A shift pulse input terminal SCLK is supplied with shift pulses occurring in the manner shown in FIG. 13B, and an inter-frame pulse input terminal FP supplied with the inter-frame pulses appearing as shown in FIG. 13C whthin the respective inter-frame periods F, each having twice as long a period as each of those time slots T1, T2, . . . , T12, . . . illustrated in FIG. 13D within which the respective shift pulses occur. A shift register SR having twelve stages is responsive to the shift pulses supplied at its clock terminal C for serially storing the input multiplexed highway pulse signals in order. Twelve AND gates AG1 through AG12 are controlled by the inter-frame pulses for extracting a set of speech data, such as P1 through P12, from the respective stages of the shift register SR. A buffer register BR also having twelve stages is responsive to the inter-frame pulses supplied to its clear terminal C for storing the parallel speech data until the appearance of the next subsequent inter-frame pulse. A switching memory CSSM stores a plurality of word positions or addresses, such as W1 through W12, equal in number to the multiplexing ratio. In the case described herein where the multiplexing ratio of the system is twelve, each word position has four bit positions. Consequently, the switching memory CSSM has a first through a fourth output lead denoted by D1, D2, D4, and D8, respectively. The temporary data is stored in CSSM in compliance with the compiled data in the general manner known in the art, and as a specific example it may be assumed that at the W1, W2, W3, W5, W7 and W12 word positions of the switching memory CSSM the members 5, 7, 12, 2, 3, and 1, respectively are stored. At the first and the second time slots T1 and T2, the words 5(0101) and 7(0111) are produced on the output leads so that logic "1" pulses appear on the first and the third output leads D1 and D4 and on the first through the third output leads D1, D2 and D4, respectively. With the example being illustrated, the wave forms cyclically appearing on the output leads D1, D2, D4 and D8 become as shown in FIGS. 13E, F, G and H. The pulse switch CSS further comprises a decoder DEC for decoding each of the four-bit binary codes successively supplied thereto through the output leads into a one-out-of-twelve code, twelve NAND gates NG1 through NG12 controlled by the respective one-out-of-twelve codes for cyclically gating the parallel information stored in the buffer register BR in the order determined by the temporary data in memory CSSM, an output terminal OUT connected either to one of the receive internal highways leading to the highway switch HWS or to one of the transmit internal highways reaching the strap terminal board JPT, and a thirteenth NAND gate NG13 responsive to the output signals of the first through the twelfth NAND gates for delivering the outpput multiplexed pulse signals, such as P5, P7, P12, . . . illustrated in FIG. 13I, to the output terminal OUT. In the specific example described the pulse signal in the fifth time slot of the input multiplexed signals is transferred to the first time slot of the output multiplexed signals.

Figure 14:
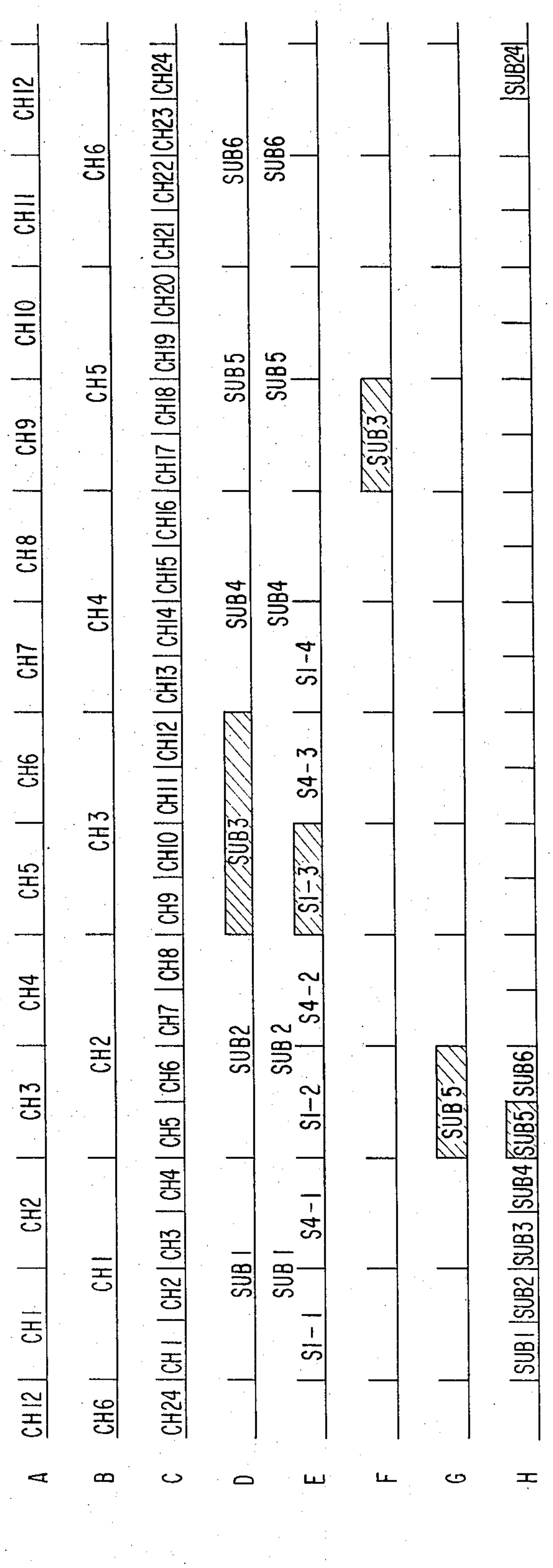
FIG. 14 shows the relationship between incoming, internal, and outgoing data for a specific example of a subscriber-to-subscriber connection arrangement.

Referring finally to FIG. 14 as well as FIGS. 1 and 2, the multiplexed pulse signals are depicted in FIGS. 14A, B, and C. FIG. 14A shows the channel arrangement for the external highways coupled to the internal highways without the interposition of the multiplexers and the demultiplexers. FIGS. 14B and C illustrate the channel arrangement for the intermediate highways. By way of example it will be assumed that a connection should be established from the third subscriber's station SUB3 of the first line concentrator S1 to the fifth subscriber's station SUB5 of the third line concentrator S3. The signal originating with the third subscriber's station SUB3 is multiplexed together with similar signals in the line concentrator S1 and rearranged by the line receiver RCV therefor as the intermediate multiplexed pulse signals of the third channel CH3 shown in FIGS. 14B and D. In order for the signal to be sent to the fifth subscriber's station S5 of line concentrator 53, it should be demultiplexed at the third line concentrator S3 from the fifth channel position CH5, illustrated in FIGS. 14C and H. The multiplexer MPX for the first and the fourth incoming highways L1R and L4R multiplexes the intermediate pulse signals supplied thereto to place the desired speech signals from SUB3 at the fifth channel position CH5, of the multiplexed pulse signals at the multiplexer output in the manner shown in FIG. 14E at S1–3.

The multiplexed pulse signals from the output of the multiplexer, shown in FIG. 14E, pass along the internal highway connected to the multiplexer output, through CSS(R) connected in said internal highway to an input of the highway switch. For the specific example described, the compiled data controls the highway switch to connect at least the desired speech signal to the output of switch HWS which is connected via a shiter CSS(R) to terminal 4R. The two shifters CSS(T) and CSS(R) are controlled in a known manner by the compiled data temporarily stored in the respective memories CSSM to shift the desired speech signal from the fifth channel position as shown in FIG. 14E to the third channel position as shown in FIG. 14G. By way of example it may be assumed that the CSS(R) shifts the desired speech signal from the fifth to the ninth channel slots as shown respectively in FIGS. 14E and 14F, and that the CSS(T) shifts the desired signal from the ninth to the third channel slots as shown respectively in FIGS. 14F and 14G. When the multiplexed signals of multiplexing ratio twelve, shown in FIG. 14G, are applied to the multiplexer which is connected via DRV to external highway L3T, the multiplexer transforms the multiplexing ratio to twenty-four and the desired signal ends up the fifth channel slot of the multiplexed signals which travel along highway L3T to the line concentrator S3.

What is claimed is:

1. A time division electronic switching system of a predetermined multiplexing ratio adapted to be connected to at least two external highways transmitting external time division multiplexed pulse signals of different multiplexing ratios, respectively, said system being of the type including a plurality of internal highways for transmitting internal time division multiplexed pulse signals at the respective time slots thereof, a common control means responsive to the data supplied through one of said external highways for producing compiled data, and a highway switch means interposed between said internal highway and responsive to the compiled data for spatially interconnecting the internal highways specified by the compiled data, wherein the improvement comprises multiplexing ratio transforming means coupled to said external highways on the one hand and said internal highways on the other hand for transforming the multiplexed signals on incoming ones of said external highways into multiplexed signals of multiplexing ratio equal to said predetermined multiplexing ratio and for transforming the multiplexed signals on outgoing ones of said internal highways into multiplexed signals of multiplexing ratios equal to the multiplexing ratios of outgoing ones of said external highways, and pulse shifter means interposed in said internal highways between said multiplexing ratio transforming means and said highway switch and responsive to the compiled data for altering the order of arrangement of the pulse signals of said internal multiplexed pulse signals transmitted through said internal highways.

2. A system as claimed in claim 1, further comprising at least one further external highway for transmitting external time division multiplexed pulse signals of said predetermined multiplexing ratio, said further external highway being coupled to one of said internal highways without the interposition of said multiplexing ratio transforming means.

3. A system as claimed in claim 1, said system employing clock pulses, each of the different multiplexing ratios being not greater than an integral submultiple of said predetermined multiplexing ratio, wherein said multiplexing ratio transforming means comprises a multiplexer coupled to the external highways, not greater in number than the ratio of said predetermined multiplexing ratio to said integral submultiple, for the external multiplexed pulse signals of the last-mentioned different multiplexing ratios and connected to one of said internal highways and responsive to said clock pulses for cyclically extracting the external multiplexed pulse signals transmitted through the last-mentioned external highways and successively arranging the extracted pulse signals in a time division fashion as a train of the internal multiplexed pulse signals to be transmitted through said one internal highway, said multiplexing ratio transforming means further comprising a demultiplexer connected to one of said internal highways and coupled to the external highways, not greater in number than the ratio of said predetermined multiplexing ratio to said integral submultiple, for the external multiplexed pulse signal of the last-mentioned different multiplexing ratios and responsive to said clock pulses for distributing the internal multiplexed pulse signals of the last-mentioned one internal highway cyclically to the last-mentioned external highways.

4. A system as claimed in claim 3, wherein said system further comprises intermediate highways for transmitting intermediate time division multiplexed pulse signals and said multiplexing ratio transforming means comprises multiplexed pulse signal transforming means interposed between said external highways and said intermediate highways and responsive to said clock pulses for translatorily transferring said external multiplexed pulse signals from the time slots thereof to those time slots of said intermediate multiplexed pulse signals which are determined with reference to said clock pulses, thereby transforming said external multiplexed pulse signals into said intermediate multiplexed pulse signals, the intermediate multiplexed pulse signals transformed from the external multiplexed pulse signals of the last-mentioned different multiplexing ratios being transmitted to the multiplexer.

5. A system as claimed in claim 1, said system employing clock pulses, each of the different multiplexing ratio being not greater than an integral multiple of said predetermined multiplexing ratio, wherein said multiplexing ratio transforming means comprises a demultiplexer coupled to one of the external highways for external multiplexed pulse signals of the last-mentioned different multiplexing ratio and connected to the internal highway, at least equal in number to the ratio of said integral multiple to said predetermined multiplexing ratio, and responsive to said clock pulses for distributing the external multiplexed pulse signals of said one external highway to the last-mentioned internal highways and a demultiplexer connected to the internal highways, at least equal in number to the ratio of said integral multiple to said predetermined multiplexing ratio, and coupled to one of the external highways for the external multiplexed pulse signals of the last-mentioned different multiplexing ratio and responsive to said clock pulses for cyclically extracting the internal multiplexed pulse signals transmitted through the last-mentioned internal highways and successively arranging the extracted pulse signals in a time division fashion as a train of the external multiplexed pulse signals to be transmitted through the last-mentioned one external highway.

6. A system as claimed in claim 5, wherein said system further comprises at least one intermediate highway for transmitting intermediate time division multiplexed pulse signals and said multiplexing ratio transforming means comprises multiplexed pulse signal transforming means interposed between said external highways and said intermediate highway and responsive to said clock pulses for translatorily transferring said external multiplexed pulse signals from the time slots thereof to those time slots of said intermediate multiplexed pulse signals which are determined with reference to said clock pulses, thereby transforming said external multiplexed pulse signals into said intermediate multiplexed pulse signals, the intermediate multiplexed pulse signals transformed from the external multiplexed signals of the last-mentioned different multiplexing ratio being transmitted to the demultiplexer.

* * * * *

UNITED STATES PATENT OFFICE

CERTIFICATE OF CORRECTION

PATENT NO. : 3,862,370

DATED : January 21, 1975

INVENTOR(S) : SHINSUKE KADOTA

It is certified that error appears in the above-identified patent and that said Letters Patent are hereby corrected as shown below:

IN THE ABSTRACT:

Line 9, delete "multipexing" and insert --multiplexing--

Line 12, delete "of" (second occurrence) and insert --by--

IN THE SPECIFICATION:

Column 1

Line 13, delete "and" and insert --an--

Line 57, after "highway" insert --switch--

Line 63, before "internal" insert --and--

Column 3

Line 10, before "internal" insert --the--

Line 30, after "relative" delete "to"

Column 6

Line 53, delete "Figs. 8F" and insert --Fig. 8F--

Column 7

Line 3, delete "numer" and insert --number--

Line 64, delete "odrer" and insert --order--

Line 67, delete "whthin" and insert --within--

UNITED STATES PATENT OFFICE
CERTIFICATE OF CORRECTION

PATENT NO. : 3,862,370 Page 2

DATED : January 21, 1975

INVENTOR(S) : SHINSUKE KADOTA

It is certified that error appears in the above-identified patent and that said Letters Patent are hereby corrected as shown below:

Page Two

IN THE CLAIMS:

Claim 5, Column 10, line 65, after "for" insert --the--

Signed and sealed this 20th day of May 1975.

(SEAL)
Attest:

RUTH C. MASON
Attesting Officer

C. MARSHALL DANN
Commissioner of Patents
and Trademarks